UNITED STATES PATENT OFFICE.

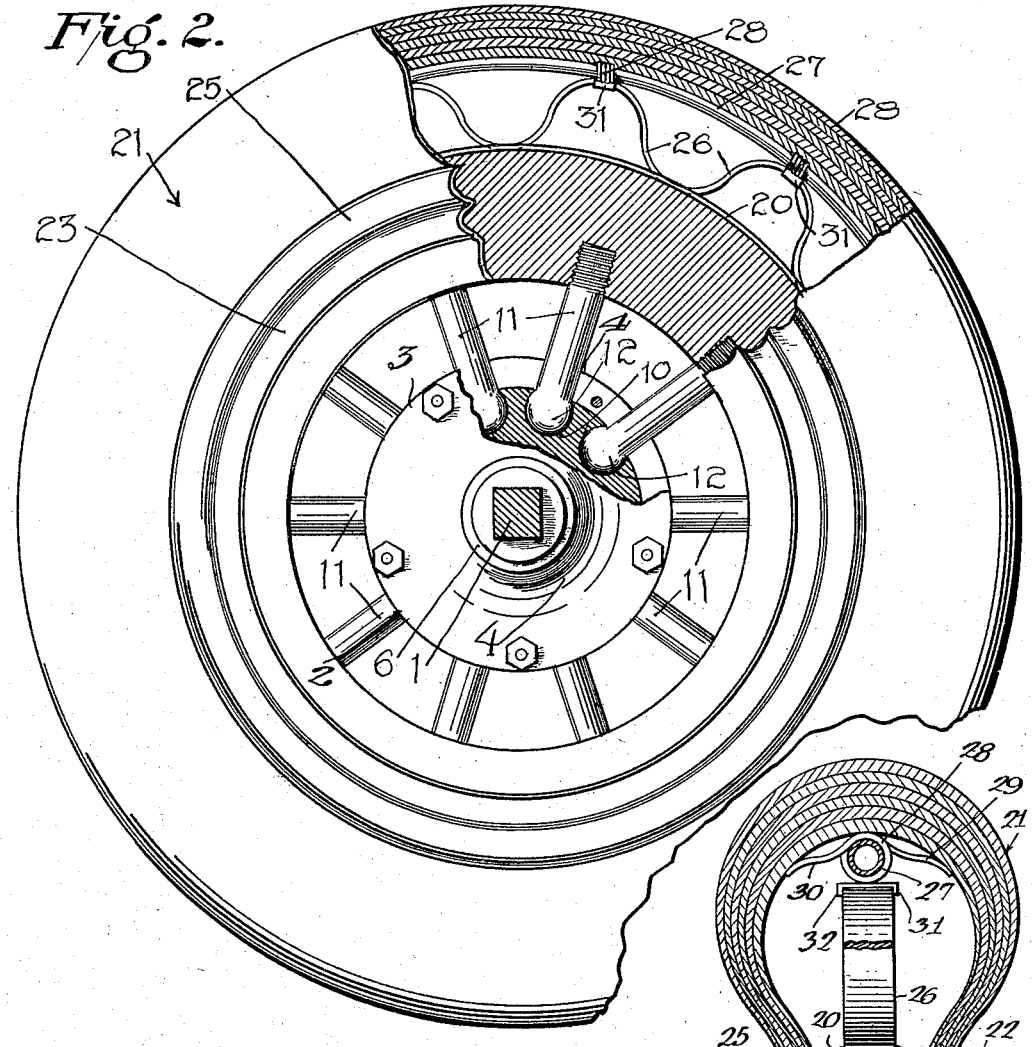

HENRY W. HOOTON AND STEPHEN A. DUGGINS, OF SALT LAKE CITY, UTAH.

SPRING-TIRE.

1,146,708. Specification of Letters Patent. Patented July 13, 1915.

Application filed January 12, 1914. Serial No. 811,736.

*To all whom it may concern:*

Be it known that we, HENRY W. HOOTON and STEPHEN A. DUGGINS, citizens of the United States, residing at Salt Lake City, in the county of Salt Lake and State of Utah, have invented certain new and useful Improvements in Spring-Tires; and we do hereby declare the following to be a full, clear, and exact description of the invention, such as will enable others skilled in the art to which it appertains to make and use the same.

Our invention relates to improvements in spring tire construction and resides principally in the provision of a spring tire which is constructed so as to present all of the resiliency and advantages of a pneumatic tire in combination with the durability of a solid tire.

Another object is to provide a spring tire which comprises a casing and a plurality of springs arranged so as to yield within the casing and to provide an effective and durable spring tire.

Another object is to improve spring tires so as to render them more practical, reliable and efficient in operation and inexpensive to manufacture.

The above and additional objects are accomplished by such means as are illustrated in the accompanying drawings, described in the following specification, and then more particularly pointed out in the claims which are appended hereto and form a part of this application.

With reference to the drawings, wherein we have illustrated the preferred embodiment of our invention as it is reduced to practice, and throughout the several views of which similar reference numerals designate corresponding parts: Figure 1 is a fragmentary vertical sectional view taken through our improved tire, Fig. 2 is a fragmentary side elevation of a wheel, showing a portion of our improved tire thereon, and Fig. 3 is a detail perspective view of the cushioning means within the casing of the spring tire.

Referring to the drawings by characters of reference, 1 designates as an entirety the axle of a vehicle to which a hub 2 is attached. The hub 2 comprises complementary hub plates 3 and 4 which are provided with sockets 10 to receive the enlarged inner ends 12 of the spokes 11. The outer ends of the spokes 11 are threaded and turned within openings in the inner face of a rim 18. The sides of the rim are grooved circumferentially, as at 19. A channel shaped ring 20 mounted upon the outer edge of the rim 18 is for a purpose to be later more fully described.

A flexible tire casing 21 of the ordinary structure preferably is secured to the rim 18 by means of bolts 22 that are inserted transversely through the sides of the casing and the rim 18. Nuts are turned upon the bolts 22 to hold them securely in place. The edges of the casing 21 are enlarged and rounded, as at 23, and said rounded portions 23 engage within the grooves 19 in the sides of the rim. Cylindrical clamping rings 24 and 25 are mounted upon opposite sides of the casing. The bolts 22 extend through and hold the rings 24 and 25 in clamping position and by means of the cylindrical clamping rings and grooved faces of the rim the casing is securely held upon the rim and is prevented from being pinched or otherwise injured.

A flat serpentine spring 26 is mounted within the casing and engages in the channel shaped ring 20 at spaced points. A tubular flexible preferably resilient pipe 27 is interposed between the inner face of the casing and outer face of the spring 26 and is secured to the spring 26 at spaced points thereon. A plurality of coil springs 28 are mounted upon the tubular cushioning member 27 at points where the tubular cushioning member is secured to the spring 26. Spring arms 29 and 30 extend outwardly from the springs 28 on the upper side thereof in opposite directions and engage the inner face of the casing 21. These arms hold the casing in extended position and yield when the casing is brought to bear upon the ground. U-shaped holding members 31 are secured at their web portions to the inner faces of the springs 28 and have their depending side portion 32 engaging the sides of the spring 26. These holding members secure the springs 28 and member 27 to the spring 26.

It will be readily seen with reference to the foregoing description and accompanying drawings that we have provided a spring tire in which the serpentine spring, tubular member 27 and springs 28 provide an effective cushioning action. The arms 29 and 30 on the springs 28 hold the tread of the casing 21 extended and give it an inflated appearance as well as assist the springs 28 and 26 in their resilient action. The tubular flexible member 27 provides means for supporting the springs 28 and acts as cushioning means as well.

In practice, we have found that the form of our invention, illustrated in the drawings and referred to in the above description, as the preferred embodiment, is the most efficient and practical; yet realizing that the conditions concurrent with the adoption of our device will necessarily vary, we desire to emphasize the fact that various minor changes in details of construction, proportion and arrangement of parts may be resorted to, when required, without sacrificing any of the advantages of our invention, as set forth.

What is claimed is:—

1. In combination with a wheel including a rim of a flexible tire casing secured to the rim, a flat serpentine spring connected with the rim and disposed within the casing, a tubular cushioning member interposed between the spring and casing, coil springs carried by the cushioning member, means to secure the coil springs to the spring, and spring arms carried by each coil spring, extending from opposite sides thereof and engaging the inner face of the tire casing.

2. In combination with a wheel including a rim of a flexible tire casing secured to the rim, a flat serpentine spring secured to the rim and disposed within the casing, a resilient tube interposed between the spring and casing and connected with the spring at spaced points thereon, a plurality of coil springs surrounding the tubular cushioning member, means carried by the coil springs to secure them to the serpentine spring, and means carried by each coil spring to hold the tire casing in extended position.

In testimony whereof we affix our signatures in presence of two witnesses.

HENRY W. HOOTON.
STEPHEN A. DUGGINS.

Witnesses:
W. H. GREGORY,
CHRISTOS PETRULER.

Copies of this patent may be obtained for five cents each, by addressing the "Commissioner of Patents, Washington, D. C."